United States Patent
Barbaresi et al.

(10) Patent No.: US 8,090,563 B2
(45) Date of Patent: Jan. 3, 2012

(54) METHOD AND SYSTEM FOR SIMULATING COMMUNICATIONS NETWORKS, OBJECT AND COMPUTER PROGRAM PRODUCT THEREFOR

(75) Inventors: Andrea Barbaresi, Turin (IT); Paolo Goria, Turin (IT); Saverio Nannicini, Florence (IT)

(73) Assignee: Telecom Italia S.p.A., Milan (IT)

( * ) Notice: Subject to any disclaimer, the term of this patent is extended or adjusted under 35 U.S.C. 154(b) by 1276 days.

(21) Appl. No.: 10/579,784

(22) PCT Filed: Nov. 21, 2003

(86) PCT No.: PCT/IT03/00761
§ 371 (c)(1),
(2), (4) Date: May 18, 2006

(87) PCT Pub. No.: WO2005/051023
PCT Pub. Date: Jun. 2, 2005

(65) Prior Publication Data
US 2007/0160181 A1    Jul. 12, 2007

(51) Int. Cl.
*G06F 7/60* (2006.01)
*G06F 17/50* (2006.01)
*G06F 9/44* (2006.01)
*G06F 15/16* (2006.01)
*G06F 15/173* (2006.01)
*H04B 1/00* (2006.01)
*H04W 24/00* (2009.01)
*H01R 31/08* (2006.01)

(52) U.S. Cl. .................. 703/13; 703/2; 703/17; 703/21; 703/22; 709/203; 709/223; 455/65; 455/68; 455/423; 455/428; 455/446; 370/241; 370/319; 370/351; 370/352; 370/432

(58) Field of Classification Search .................. 703/13, 703/2, 17, 21, 22; 709/203, 223; 455/65, 455/68, 423, 428, 446, 506; 370/241, 319, 370/351, 352, 432
See application file for complete search history.

(56) References Cited

U.S. PATENT DOCUMENTS
5,561,841 A * 10/1996 Markus .................. 455/446
(Continued)

FOREIGN PATENT DOCUMENTS
WO   WO 02/104055 A1   12/2002
(Continued)

OTHER PUBLICATIONS
Marzo et al. "An ATM Distributed Simulator for Network Management Research", IEEE 2001.*
(Continued)

*Primary Examiner* — Kamini S Shah
*Assistant Examiner* — Shambhavi Patel
(74) *Attorney, Agent, or Firm* — Finnegan, Henderson, Farabow, Garrett & Dunner, L.L.P.

(57) ABSTRACT

A method for simulating a telecommunications network through objects that model a respective set of network modules or devices provides for the insertion, for every module or device of the set, of at least one respective interfacing object with the other modules of the set. The above interfacing object has an external side and an internal side with respect to the module or device. Such external side has a character that is independent of idiosyncrasies of such module or device and is therefore uniform for all modules or devices. When there are a plurality of different implementations of the same module or device, it is possible to provide both a unique interfacing object for all different implementations, and a respective interfacing object for every single implementation.

24 Claims, 5 Drawing Sheets

U.S. PATENT DOCUMENTS

Figure 3:
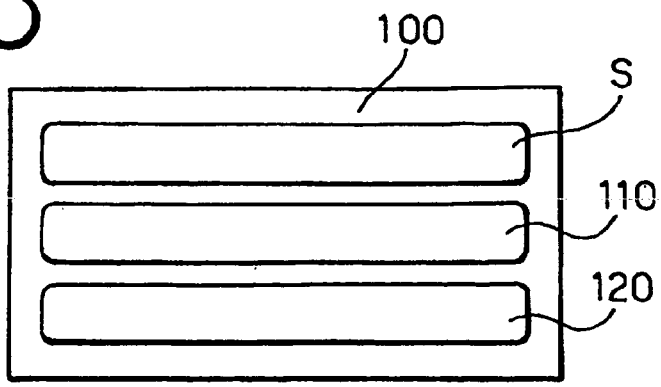

| | | | | |
|---|---|---|---|---|
| 5,794,128 | A * | 8/1998 | Brockel et al. | 455/67.11 |
| 6,134,514 | A * | 10/2000 | Liu et al. | 703/17 |
| 6,272,450 | B1 * | 8/2001 | Hill et al. | 703/13 |
| 6,650,731 | B1 * | 11/2003 | Steltner et al. | 379/15.01 |
| 6,922,395 | B1 * | 7/2005 | Elliott et al. | 370/241 |
| 6,971,063 | B1 * | 11/2005 | Rappaport et al. | 715/733 |
| 6,973,622 | B1 * | 12/2005 | Rappaport et al. | 715/735 |
| 7,263,471 | B2 * | 8/2007 | Barbaresi et al. | 703/2 |
| 7,295,568 | B2 * | 11/2007 | Kossi et al. | 370/432 |
| 2004/0032857 | A1 * | 2/2004 | Tannan | 370/351 |
| 2004/0172231 | A1 * | 9/2004 | Barbaresi et al. | 703/13 |
| 2005/0265321 | A1 * | 12/2005 | Rappaport et al. | 370/352 |
| 2007/0097868 | A1 * | 5/2007 | Bizzarri et al. | 370/241 |
| 2009/0029651 | A1 * | 1/2009 | Polini et al. | 455/68 |

FOREIGN PATENT DOCUMENTS

| | | |
|---|---|---|
| WO | WO 03/069814 A2 | 8/2003 |

OTHER PUBLICATIONS

Szymanski et al. "Real-Time On-Line Network Simulation", IEEE 2001.*

Boukerche et al. "SWiMNet: A Scalable Parallel Simulation Testbed for Wireless and Mobile Networks", Wireless Networks 7, 467-486, 2001.*

Flanagan et al. "WCDMA Network Cost Function Minimization for Soft Handover Optimization with Variable User Load", IEEE 2002.*

Hamalainen et al. "Advanced WCDMA Radio Network Simulator", IEEE 1999.*

Hoppe et al. "Dynamic Simulator for Studying WCDMA Radio Network Performance", IEEE 2001.*

Laiho et al. "Radio network planning process and methods for WCDMA", 2001.*

Raivio et al. "Neural Analysis of Mobile Radio Access Network", IEEE 2001.*

* cited by examiner

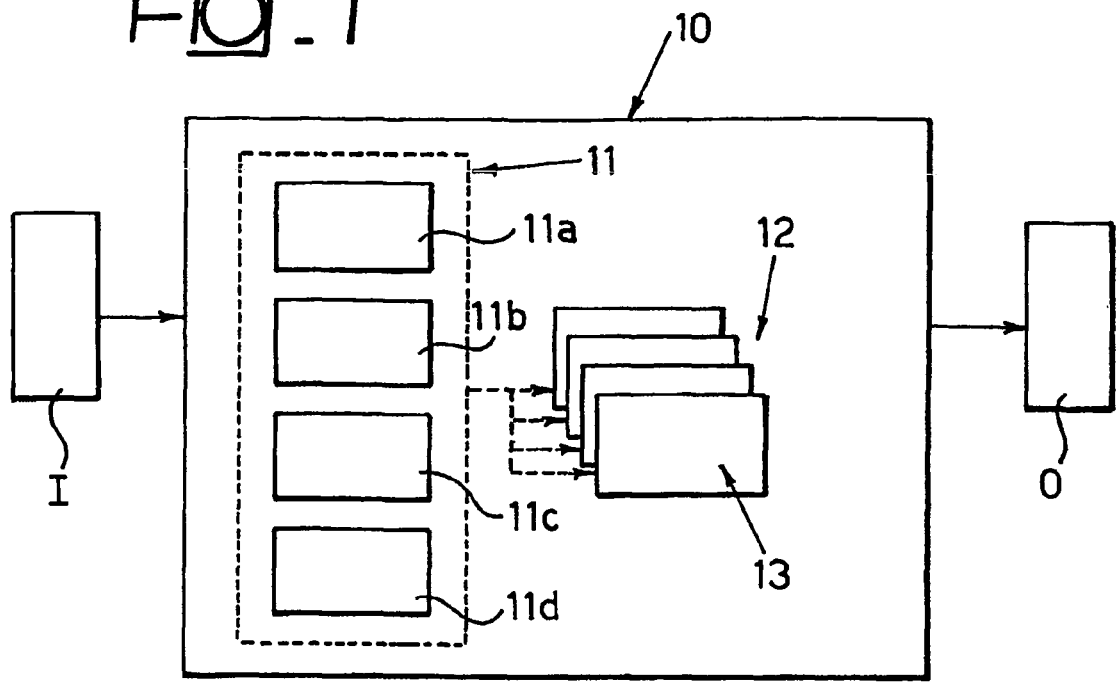
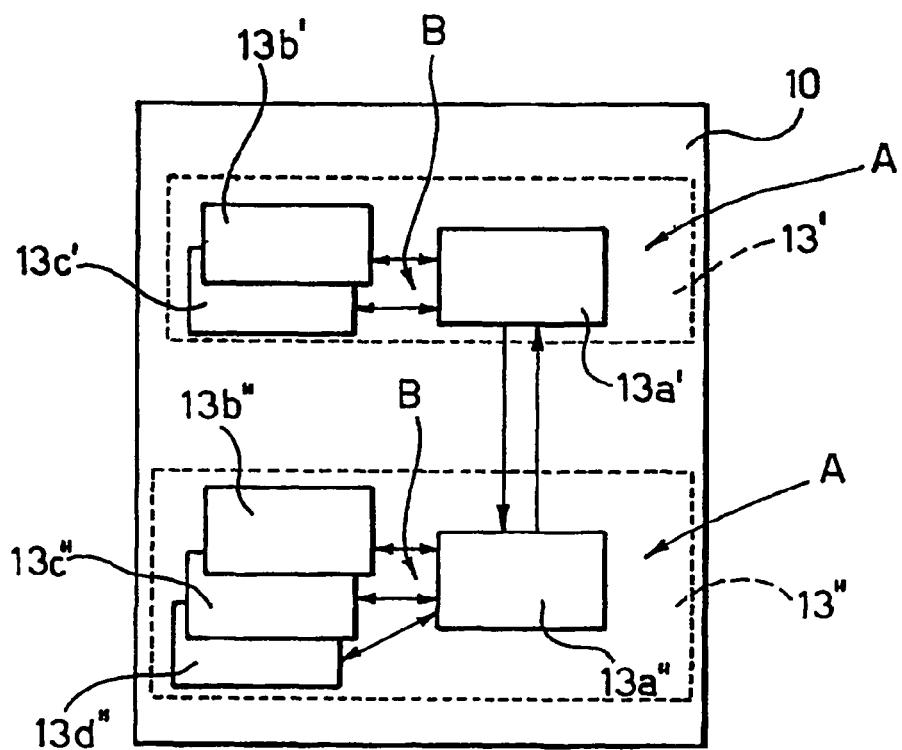

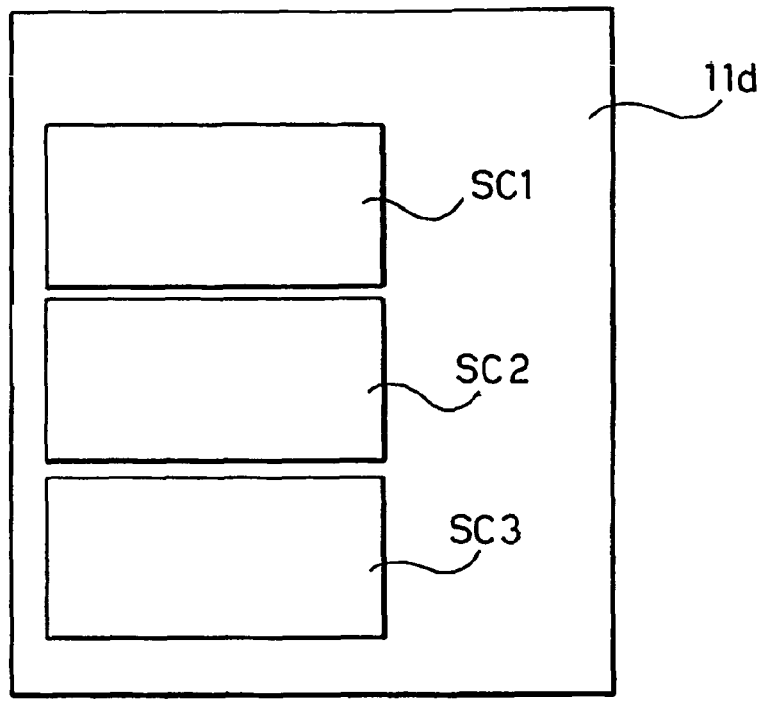
Fig_6
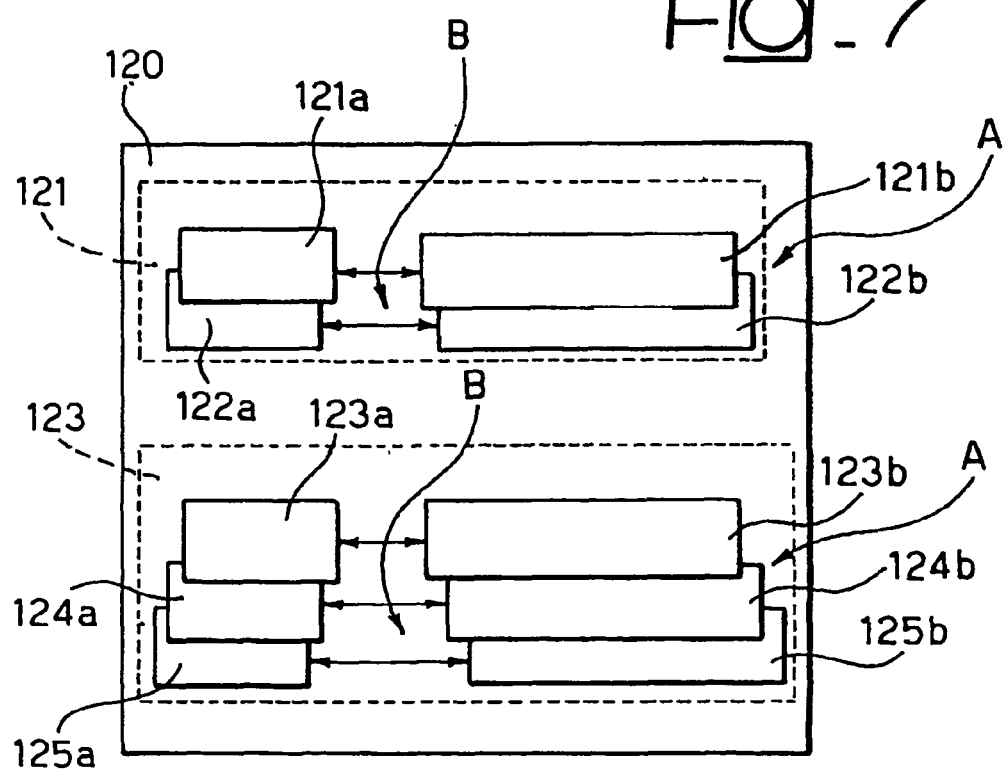
Fig_7

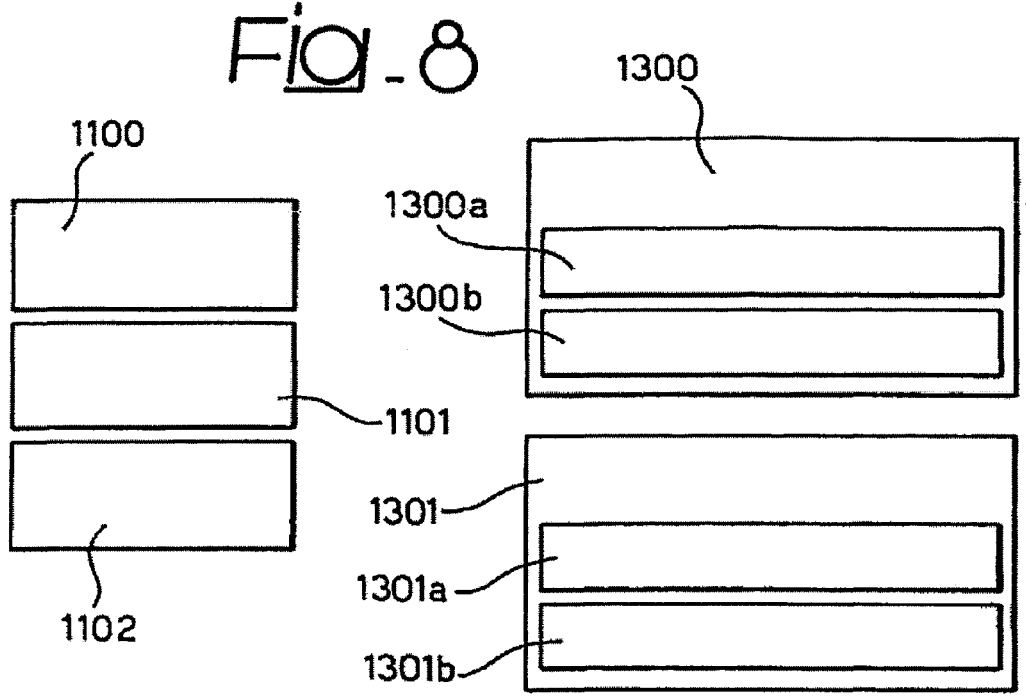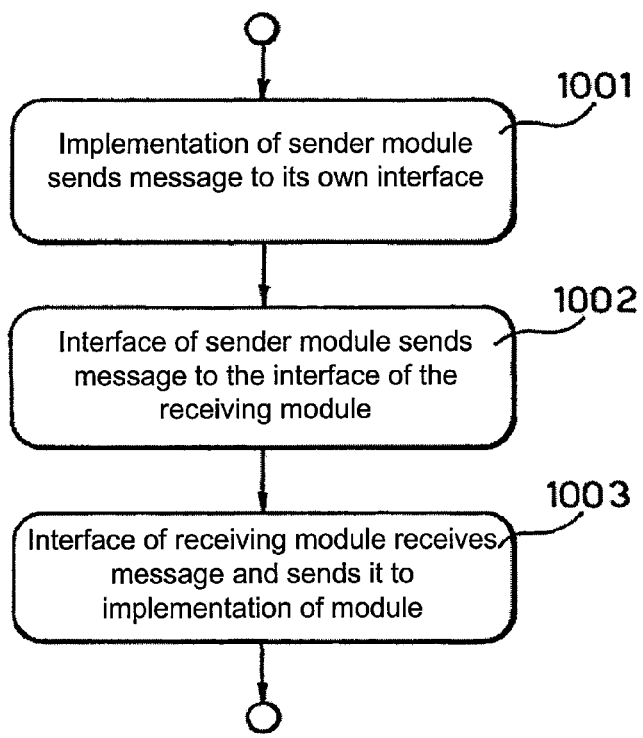

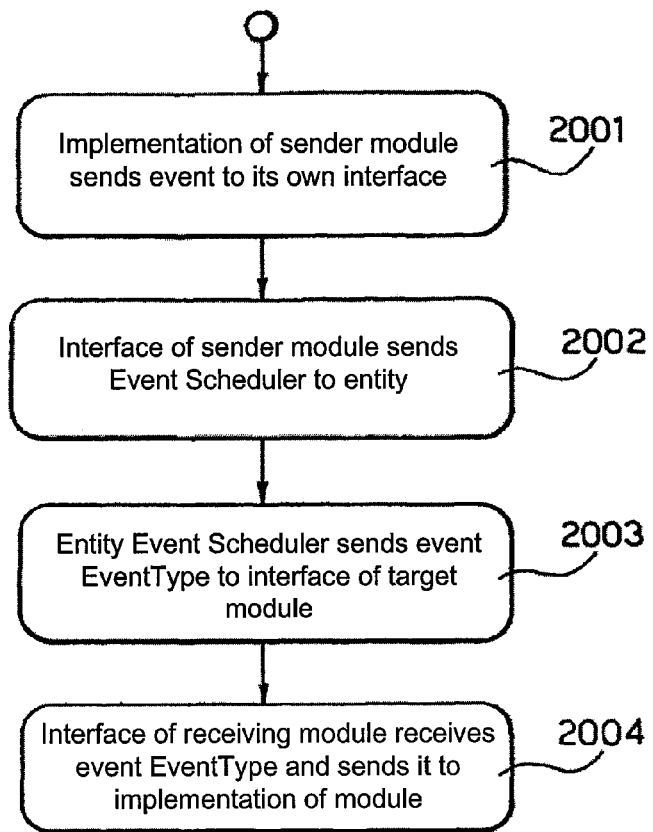
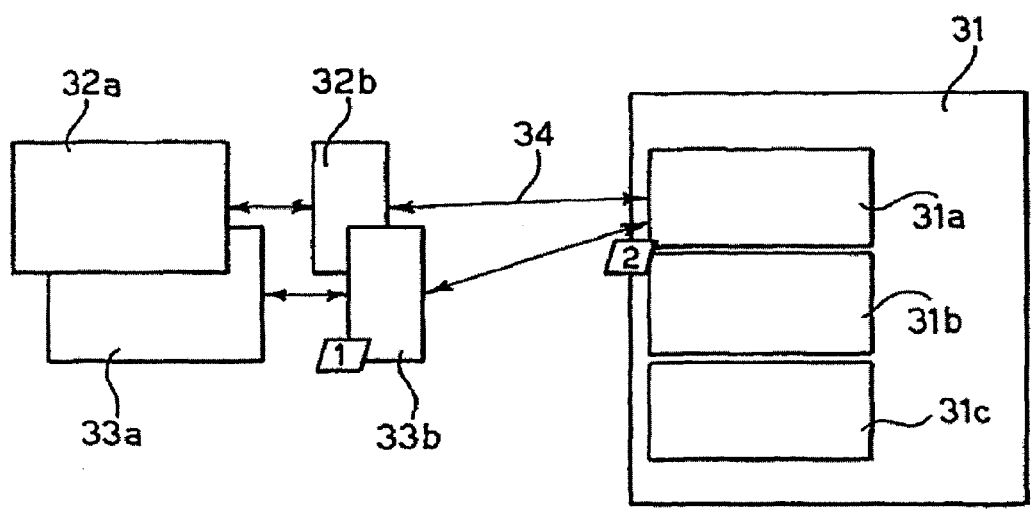

METHOD AND SYSTEM FOR SIMULATING COMMUNICATIONS NETWORKS, OBJECT AND COMPUTER PROGRAM PRODUCT THEREFOR

CROSS REFERENCE TO RELATED APPLICATION

This application is a national phase application based on PCT/IT2003/000761, filed Nov. 21, 2003, the content of which is incorporated herein by reference.

FIELD OF THE INVENTION

The present invention refers to techniques for simulating communications networks such as, for instance, radio-mobile cellular networks.

The simulation, is an essential step in planning, designing, realizing and managing such networks, especially in view of the optimisation of performances of the networks themselves. Particularly, the simulation plays an important role both at check level for planning a new network, and at updating and optimising level for performances of an already operating network.

The invention has been devised paying particular care to the techniques of survey of inherent statistic data to the behaviour of the simulated network. Typical examples of statistic data that can be measured in a radio-mobile cellular network system simulator are network capacity, mean delay on packet transfer, percentage of blocked calls, etc.

DESCRIPTION OF THE PRIOR ART

It is known that there are cellular radio-mobile network system simulators characterised by an object architecture, such as disclosed, for example, in-WO-A-02/104055. According to the object approach, the elementary decomposition unit is not the operation (method), but the object, meant as model of a real entity (a real-world object).

It is known that in such simulators there are modules or devices adapted to simulate the behaviour of physical network devices. Every module or device can have many implementations (according to simulated functionalities or technologies) and each of these implementations can be used at will in the simulations: a different way of operating of the module in itself corresponds to each implementation. It is also known that the modules or devices in the simulator mutually exchange information, with the purpose of simulating the behaviour of real physical network devices; the exchange of information occurs through two modes: with "messages" and with "events".

The communication with messages is characterized in that the receipt of information by the target module occurs simultaneously with the dispatch from the source module; instead, the communication with events is characterized in that the receipt of information from the target module does not occur simultaneously with the transmission from the source module, but in a particular following time instant after the transmission time: the use of the events serves for timing the receipt of a piece of information from the source module.

It is also known that these simulators are able to perform measurements of the behaviour of the various simulated modules or devices, providing some statistics related to these measurements as simulation results.

In the arrangement described in WO-A-02/104055 the objects-simulator architecture, provides an engine in which there is an entity called statistic Manager. Task of such entity is performing, by intercepting communications between module and module, the measurements related to the behaviour of modules or devices themselves and processing statistics of measured statistic data.

A typical example of statistic processing is the computation of mean transmission delays of a packet. In this case, the Statistic Manager entity performs, for every packet transmitted in the simulated system, a delay measurement, averaging among them the various measured delays, obtaining the mean delay as result.

It is known that—with analogous operating criteria—all interesting statistic processing in a system simulator can be realized, for instance for radio-mobile cellular networks.

The Applicant has observed that in a situation of the previously described type, various types of problems occur that are intrinsically tied up to the possible and frequent presence of different implementations of the same network functionality.

Firstly, the communication among two modules occurs directly through the respective implementations: in every implementation of a given module, it is therefore necessary to insert, for the Statistic Manager's benefit, all information that identify communication modes with all implementations of the other modules with which the affected module can communicate.

Secondly, the mechanism with which the Statistic Manager measures the behaviour of the modules or devices changes according to implementation, because it has to suit itself for the particular module/device implementation.

Insofar, depending on known prior art, with the purpose to be able to take into account the presence of many implementations of the same device or module, it is necessary to insert in the Statistic Manager a specific interception and measuring mechanism, operation that can be also very costly in terms of time and processing complexity.

It will also be appreciated that this is worth above all for the telecommunications networks (where the same network functionality is performed by apparatuses supplied by different manufacturers, with different implementations) and that the same type of problems occurs, in substantially identical terms, also in the communication between various modules or devices, therefore in a way that is independent from the intervention of the Statistic Manager or an equivalent entity.

Object And Synthesis Of The Present Invention

Object of the present invention is therefore solving the above-mentioned problems.

According to the present invention, such object is reached thanks to a method having the characteristics specifically stated in the claims that follow. The invention also relates to the corresponding system (simulator), to the objects included in the same, as well as to a corresponding computer program product loadable in the memory of at least one electronic computer and comprising portions of software code to perform the method according to the invention when the product is executed on a computer: in this context such term must be deemed entirely equivalent to means readable by a computer comprising instructions to check a network of computers in order to perform the method according to the invention. The reference to "at least one electronic computer" is obviously aimed to show the possibility of performing the solution according to the invention in a de-centralized context.

In its currently preferred embodiment, the invention solves the above-mentioned problems by introducing for the modules or devices in the simulator respective interfacing a objects with the other modules. Such interfacing objects have an "external" side and an "internal" side with respect to module or device. Such external side has an independent character from the idiosyncrasies of said module or device and is therefore uniform for all system modules or devices.

The term "uniform" obviously means such a character that the "external" side of said interfacing objects is independent from the respective module or device, and can thereby be substantially identical for all modules or devices.

The previously-mentioned problems, intrinsically linked to the possible presence of different implementations of network functionality, are thereby solved, also as regards to the possible intervention of the Statistic Manager or an equivalent entity.

In a particularly preferred way, the following interfacing objects are introduced:

communication interfaces among all simulated modules and/or devices: interfaces of this type manage the communication within "events" and with "messages" and make implementations of single modules independent from the type of communication that every module is able to perform with other modules in the simulator. Particularly, for every module/device there is a unique communication interface for all different implementations of the considered module; every communication operation among modules and/or devices occurs through the communication interfaces;

statistic interfaces of simulated modules and/or devices: the interfaces of this type make statistic surveys performed by the Statistic Manager entity independent from the implementation of simulated modules from which statistic data are detected.

Particularly, there is an interfacing object for every single implementation of the modules of interest; in this interfacing object, the measuring mechanism of statistic data from the corresponding module is realized in a simple way. The Statistic Manager entity collects the detected data through the external side, made uniform, of interfacing objects and more directly from single modules.

BRIEF DESCRIPTION OF THE ATTACHED DRAWINGS

Figure 4:
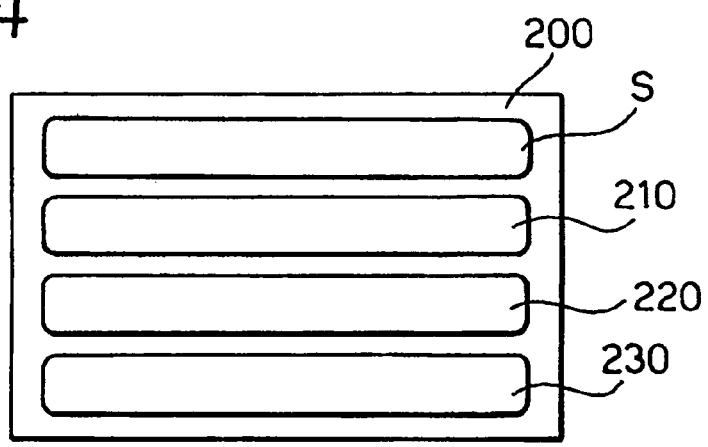
Figure 5:
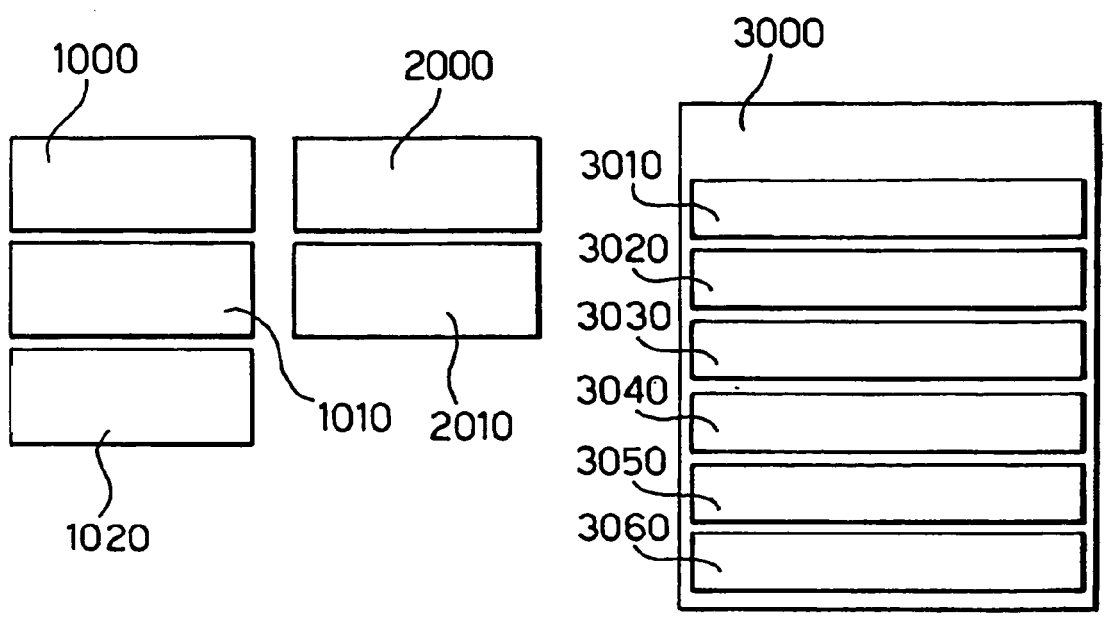

The invention will be described, purely as a non-limiting example, with reference to the attached drawings, in which:

FIG. 1 is a functional approximate diagram of a simulator of the herein described type, FIG. 2 shows the architecture of related communication interfaces, FIGS. 3, 4 and 5 show a possible organization of messages and events within a simulator of the herein described type, FIG. 6 is a functional approximate diagram of a statistics managing module in a simulator of the herein described type, FIGS. 7 and 8 show in detail the architecture of the relative statistic interfaces, FIG. 9 and 10 are exemplified flow diagrams of the operating modes of the herein described simulator, and FIG. 11 synthetically shows the statistics operation within a simulator of the herein described type.

DETAILED DESCRIPTION OF AN EMBODIMENT OF THE INVENTION

FIG. 1 shows the architecture of a simulator 10 comprising an engine 11 in which there are all typical managing functionalities of the simulation of a telecommunications network, such as a radio-mobile network, namely:

Parameter Manager 11*a*,
Event Scheduler 11*b*,
Factory Manager 11*c*, and
Statistic Manager 11*d*.

A device package 12 is then present in which the different devices 13 are contained, representative of the physical network devices and the objects related to the scenario to simulate.

Every device contains different modules related to the different functionalities managed by the device itself.

Such a simulator, working in general among a set of input signals I and a set of output signals O, can be implemented, for instance, on a computer with Intel Pentium III processor and Microsoft Windows operating system, using Microsoft Visual Studio 6.0 development environment and ANSI C++ programming language.

As shown in FIG. 2, every module 13', 13" present in the device package 12 can have many implementations 13*b'*, 13*c'* or 13*b"*, 13*c"*, 13*d"*, each one related for instance to a set of simulated functionalities or to a specific technology.

The herein described arrangement has the chance of having, for all implementations of a module, a single communication interface 13*a'*, 13*a"*, . . . that is used in the information exchange with other modules.

The concept is general and can be applied to any module or device in a cellular network simulator.

Every module has its own communication interface: interface 13*a'* for module 13' and interface 13*a"* for module 13".

Module 13' has two different implementations 13*b'* and 13*c'*, and both use interface 13*a'* to communicate with other modules, as for instance with module 13'.

Module 13" has three different implementations 13*b"*, 13*c"* and 13*d"*, and all use interface 13*a"* to communicate with the other modules, as for instance with module 13'.

The use of interfaces in the communication among modules allows making the insertion of new implementations of a module: simpler and quicker without having to manage from time to time the functionalities related to information exchange.

Every communication interface (or "interfacing object") introduces in fact an "external" side A and an "internal" side B with respect to module or device implementations 13*b'*, 13*c'*, or 13*b"*, 13*c"* and 13*d"*.

The internal side B reflects the characteristics (or "idiosyncrasies") of the specific module or device and, more particularly, of the specific implementation considered every time.

Contrarily, the external side A of every interfacing object 13*a'*, 13*a"* is uniform for all system modules or devices, and therefore for all possible implementations of the same.

The term "uniform" obviously means such character for which the external side A of the interfacing objects is independent from the respective module or device, and can thereby be substantially identical for all modules or devices.

Particularly, the external side A of the interfacing objects is configured in order to allow the information interchange between modules or devices with two modes:

i) through "messages": the information exchange occurs through the use of objects called "messages".

Depending on the structure shown in FIG. 3, every "Message" 100 is characterised by an indicator of the source or sender module or device S, by an indicator of the target module or device "Target" 110 and by the information exchanged among modules "Data" 120. The communication with messages is characterized in that the receipt of information from the target module occurs simultaneously with the transmission from the source module.

ii) through "events": the information exchange occurs through the use of objects called "events". Depending on the structure shown in FIG. 4, every "Event" 200, is characterised by an indicator of the source or sender module or device S, by a "Time" 210, by an indicator of the target module or device "Target" 220 and by information exchanged among modules "Data" 230. The communication with events is characterized in that the receipt of information from the target module does not occur simultaneously with the transmission from the source module, but in a particular time instant following the transmission time.

The use of events serves for "delaying" the receipt of an information from the receiving module. The communication with events occurs through the entity called Event Scheduler, that can be found in the simulator engine; function of the Event Scheduler is storing events, and relative time in a queue, called "queue of events", and sending every event to its own target module when the simulation time reaches the event time itself.

The implementation of every communication interface provides for four main functionalities, respectively called:

Messagedispatcher <MessageType>: dispatching functionality of messages of the MessageType type, where MessageType represents any type of message;

EventDispatcher <EventType>: dispatching functionality of events of the EventType type, where EventType represents any type of event;

MessageListener <MessageType>: receiving functionality of messages of the MessageType type, where MessageType represents any type of message; and EventListener <EventType>: receiving functionality (of events of the EventType type, where EventType represents any type of event.

Every dispatching or receiving functionality of messages/events can be found or not in the communication interfaces.

It is possible to have interfaces with only a subset of possible functionalities, for instance an interface can be only MessageListener of a message without necessarily having the other three functionalities.

Besides, in a single interface, the same functionality can be present many times, in order to manage different messages/events. For example, an interface that has to be able to receive two types of, different events has two EventListener functionalities: one for the first type of event and another for the second type of event.

As further example (not to be meant as limiting of the scope of the invention) what is shown in FIG. 5 can be taken into account.

Here there are types of events "Event A" 1000, "Event B" 1010 and "Event C" 1020, the types of messages "Message 1" 2000 and "Message 2" 2010 and the interface related to module "Module ABC" 3000 that it is able of:

receiving and sending events of the "Event A" type
receiving events of the "Event B" type
sending events of the "Event C" type
receiving message "Message 1", and
sending message "Message 2"

The related interface has the following functionalities active:

EventListener <Event A> 3010
EventDispatcher <Event A> 3020
EventListener <Event B> 3030
EventDispatcher<Event C> 3040
MessageListener <Message 1> 3050, and
MessageDispatcher <Message 2> 3060

The realization of the simulator interfaces can advantageously be performed with C++ programming language.

Int case of the above-described example we have the following code:

```
class Event
{
GenericEventDispatcher * source
GenericEventListener * target
Int timej
}
class EventA
: public Event
{
}
class EventB
: public Event
{
}
class EventC
: public Event
{
}
class Message
{
GenericMessageDispatcher * source
GenericMessageListener * target
}
class Message1
: public Message
{
}
class Message2
: public Message
{
}
class ModuloABC_Interface
: public EventListener <EventA>
, public EventDispatcher <EventA>
, public EventListener <EventB>
, public EventDispatcher <EventC>
, public MessageListener <Message1>
, public MessageDispatcher <Message2>
{
}
class ModuloABC
: public ModuloABC_Interface
[...]
{
[...] ABC module implementation
}
```

The use of simulator interfaces also involves the architecture related to Statistic Manager.

In the simulator, statistic processing is the task of the Statistic Manager 11*d* entity that can be found in the engine (see FIGS. 1 and 6).

The Statistic Manager 11*d* contains the objects that store the various statistics, called "Statistic Calculators".

FIG. 6 shows as an example three entities SC1, SC2 and SC3, every one operating as statistic calculator related to the processing of a particular statistic quantity: SC1 can for instance be related to system capacity, SC2 related to mean transmission throughput of the packets, SC3 related to the level of power used in transmission by the simulated radio-mobile terminal.

The operation of the affected computers is independent from the implementations of the simulated modules and is only function of the types of statistic samples to analyse.

The herein described arrangement provides that, for every implementation of a module, an adequate statistic interface is realized, referenced by the name "Data Collector", whose aim is collecting the statistic samples of interest from the corresponding implementation and sending them to the Statistic Manager entity, that proceeds then to their processing.

As a non-limiting example, FIG. 7 can be taken into account, where there is a device 120 in which two modules 121 and 123 are present.

Module 121 has two different implementations 121*a* and 122*a*.

For every implementation, there is a statistic interface (Data Collector): implementation 121*a* corresponds to statistic interface 121*b*, implementation 122*a* corresponds to statistic interface 122*b*.

Module 123 has three different implementations 123*a*, 124*a* and 125*a*.

For every implementation there is a statistic interface (Data Collector): implementation 123*a* corresponds to statistic interface 123*b*, implementation 124*a* corresponds to statistic interface 124*b*, implementation 125*a* corresponds to statistic interface 125*b*.

Also in this case, every communication interface or interfacing object has in fact an external side A and an internal side B with respect to module or device implementations 121*a*, 122*a* or 123*a*, 124*a* and 125*a*.

The internal side B reflects the characteristics or idiosyncrasies of the specific module or device and, more particularly, of the specific implementation considered every time.

Contrarily, the external side A of every interfacing object 121*b*, 122*b* or 123*b*, 124*b*, 125*b* is uniform for all system modules or devices and therefore for all possible implementations of the same.

The external side A of the interfacing objects is therefore independent from the respective module or device, and can thereby be substantially identical for all modules or devices.

As an explanation and example, it can be supposed that module 121 manages the transmission of a packet;

in this case a statistic sample of interest is the time employed to transmit every single packet. Therefore, every statistic interface 121*b* and 122*b* of the different implementations of module 121*a* and 121*b* must be able to identify and collect the time used to transmit a packet from the corresponding implementation of module 121.

In general, the two mentioned implementations of module 121*a* and 122*a* totally manage the transmission of a packet in different way, therefore the two corresponding statistic interfaces 121*b* and 122*b* have to measure the time of transmission of a packet with a different mechanism.

The implementation of every statistic interface preferably provides for a functionality DataDispatcher <DataType>, namely a dispatching functionality of statistic data of the DataType type, where DataType represents any statistic data type.

As further non-limiting example, what is shown in FIG. 8 can be taken into account, where in the left part there are the types of statistic data "Data A" 1100, "Data B" 1101 and "Data C" 1102, and in the right part there are the statistic interfaces related to module "Module 1" 1300 and to module "Module 2" 1301

The interface related to module "Module 1" 1300 are able to send statistic data of the "Data A" 1100 type and of the "Data C" 1102 type.

The interface related to module "Module 2" 1301 are able to send statistic data of the "Data B" 1100 type and of the "Data C" 1102 type.

Then the interface related to module "Module 1" 1300 has the following functionalities active:
  DataDispatcher <Data A> 1300*a*
  DataDispatcher <Data C> 1300*b*.

The interface related to module "Module 2" 301 has the following functionalities active:
  DataDispatcher <Data B> 1301*a*
  DataDispatcher <Data C> 1301*b*

The realization of statistic interfaces in the simulator is preferably performed with programming language C++.

In case of the above-described example, we have the following code:

```
class DataA
{
[...]
}
class DataB
{
[...]
}
class DataC
{
[...]
}
class Modulo1_StatisticInterface
: public DataDispatcher <DataA>
, public DataDispatcher <DataC>
{
}
class Modulo2_StatisticInterface
: public DataDispatcher <DataB>
, public DataDispatcher <DataC>
{
}
```

The operation of dispatching a message is shown in FIG. 9 and is described as follows:
  step 1001: the implementation of sender module sends the message to its own interface MessageType;
  step 1002: the interface of sender module sends the message MessageType to the interface of the receiving module;
  step 1003: the interface of the receiving module receives the message MessageType and sends it to the implementation of the receiving module.

The operation of dispatching an event is shown instead in FIG. 10 aid is described as follows:
  step 2001: the implementation of the sender module sends the event to its own interface EventType, pointing out the time of receipt t;
  step 2002: the interface of the sender module sends Event Scheduler to the entity, the event EventType pointing out the time of receipt t;
  step 2003: when the simulation reaches the time t, the entity Event Scheduler sends the event EventType to the interface of the target module;
  step 2004: the interface of the receiving module receives the event EventType and sends it to the implementation of the module.

The general operation of the method for collecting statistic samples in a given simulator is shown in FIG. 11, where as an example the Statistic Manager 31 manages three statistics (Statistic Calculator) 31*a*, 31*b* and 31*c*. Statistic 31*a* processes samples type K, that obtains from a first module having two implementations 32*a* and 33*a*, which respectively correspond to statistic interfaces 32*b* and 33*b*.

The collection of statistic samples occurs as described as follows:
  during simulation statistic interfaces 32*b* and 33*b* identify samples type K, each one with a proper mechanism that takes into account the functionalities of the corresponding implementations 32*a* and 33*a*;

at every simulation step, the Statistic Manager queries the statistic interfaces so that they send directly collected samples type K to statistic 31*a*; and with a suitable interval, statistic 31*a* processes samples type K and sends for the result.

The herein described arrangement essentially involves two main advantages.

Firstly, the communication mode between simulated modules and devices is independent from individual implementations of modules/devices. In this way, the information exchange modes between modules and devices are established once and for all defining the communication interfaces of every module and device. Every time it is decided to introduce in the simulator a new implementation for a device or for a module, it is not necessary to worry about the management of information exchange because this is already managed.

Secondly, it is possible to rationalize the planning of statistics managed by the Statistic Manager entity since it does not depend from which implementations of devices or modules are used in the simulation. In this way, every time it is decided to introduce in the simulator a new implementation for a device or for a module, it is enough to realize the corresponding statistic interface (Data Collector), without having to modify the operation of the Statistic Calculator.

As a result of the described situation, a flexible and slender general architecture of the simulator is obtained.

As already said, the implementation of the described simulator can be realized with any type of computer, such as Intel, SUN, Apple, . . . and with any operating system (Windows, Linux, Unix, MAC OS . . . ). The use of ANSI C++ programming language is only a possible choice; the implementation of the simulator can be in fact also performed in other programming languages, such as Java, Delphi, Visual Basic, . . .

The choice of ANSI C++ language appears currently preferred in view of the good planning flexibility offered by said programming language and of the high level of obtainable performances in the finished program in terms of execution speed.

The invention can be used in cellular networks simulators that simulate other systems besides the mentioned GSM, OPRS and UMTS. The invention can be used in cellular networks simulators that adopt the events simulation technique or the Montecarlo simulation technique.

The skilled technicians in the art will immediately appreciate that the invention does not necessarily deal with the only simulation of radio-mobile cellular networks: the invention can in fact be also used in other types of simulators, where there is a similar, architecture with modules and devices complying with real physical equipment and where it is necessary to communicate among various modules/devices the parameters related to simulated functionalities.

It is therefore evident that, notwithstanding the principle of the invention, the realisation particulars and the embodiments can be broadly changed with respect to what has been described and shown, without departing from the scope of the present invention, as defined by the attached claims.

The invention claimed is:

1. A method for simulating a communications network which includes a plurality of physical network devices performing a plurality of network functions, the method comprising;

providing for each of the plurality of physical network devices a corresponding module or device of a plurality of modules or devices, the corresponding module or device simulating a behavior of the respective physical network device including simulating a communication of the respective physical network device with other physical network devices, wherein at least one physical network device of the plurality of physical network devices is simulated by a first implementation of a first module or device of the plurality of modules or devices, wherein the first module or device has a plurality of different implementations, the plurality of different implementations performing a same network function of the at least one physical network device, and each of the plurality of different implementations using a corresponding communication mechanism for communicating with other modules or devices of the plurality of modules or devices, the corresponding communication mechanism being defined by a number and types of communication functionalities utilized by the corresponding implementation and being different from communication mechanisms used by other implementations; and providing, for the first module or device, an interfacing object through which the first module or device communicates with other modules or devices of the plurality of modules or devices, said interfacing object having an external side and an internal side with respect to the first module or device, said external side using a single communication mechanism for communicating with other modules and devices, the single communication mechanism being independent of the first implementation and the single communication mechanism being used by each of the plurality of modules or devices for communicating with other modules and devices, and said internal side being configured to communicate with each of the plurality of different implementations of the first module or device through the corresponding communication mechanism.

2. The method according to claim 1, wherein the plurality of physical network devices are simulated by the plurality of different implementations of the specific module or device, and wherein the method further comprises providing a unique interfacing object for the plurality of different implementations.

3. The method according to claim 1, wherein a plurality of physical network devices are simulated by the plurality of different implementations of the specific module or device, and wherein the method further comprises providing a respective interfacing object for everyone of the plurality of different implementation.

4. The method according to claim 1, comprising the step of configuring the external side of said interfacing object to allow communication among the plurality of modules or devices as events.

5. The method according to claim 1, comprising the step of configuring the external side of said interfacing object to allow communication among the plurality of modules or devices as messages.

6. The method according to claim 1, comprising the steps of:

providing a statistics managing module to collect statistic data pertaining to the operation of said simulated network; and measuring said statistic data through said statistics managing module through the external side of said interfacing object.

7. The method according to claim 1, wherein the external side of said interfacing object exchanges information with homologous objects associated with the plurality of modules or devices through structures comprising:
- an indicator of the source module or device;
- an indicator of the target module or device; and
- the exchanged information.

8. The method according to claim 1, wherein said interfacing object exchanges information with homologous objects associated with the plurality of modules or devices through structures comprising:
- an indicator of the source module or device;
- a time indicator;
- an indicator of the target module or device; and
- the exchanged information.

9. The method according to claim 1, wherein said interface object comprises functionalities selected from:
- messages dispatching functionality,
- events dispatching functionality,
- messages receiving functionality, and
- events receiving functionality.

10. A system comprising at least one computer for simulating a communications network which includes a plurality of physical network devices performing a plurality of network functions, the system comprising:
- a plurality of modules or devices, each of the plurality of modules or devices corresponding to one of the plurality of physical network devices and simulating, using the at least one computer, a behavior of the respective physical network device including simulating a communication of the respective physical network device with other physical network devices, wherein at least one physical network device is simulated by a first implementation of a first module or device of the plurality of modules or devices, wherein the first module or device has a plurality of different implementations, all of the plurality of different implementations performing a same network function of the at least one physical network device, and each of the plurality of different implementations using a corresponding communication mechanism for communicating with other modules or devices of the plurality of modules or devices, the corresponding communication mechanism being defined by a number and types of communication functionalities utilized by the corresponding implementation and being different from communication mechanisms used by other implementations of the plurality of implementations; and
- an interfacing object for the first module or device, wherein through the specific interfacing object the first module or device communicates with other modules or devices of the plurality of modules or devices; said interfacing object having an external side and an internal side with respect to the first module or device, said external side using a single communication mechanism for communicating with other modules and devices, the single communication mechanism being independent of the first implementation and the single communication mechanism being used by each of the plurality of modules or devices for communicating with other modules and devices, and said internal side being configured to communicate with each of the plurality of different implementations of the first module or device through the corresponding communication mechanism.

11. The system according to claim 10, wherein the plurality of physical network devices are simulated by the plurality of different implementations of the first module or device, and wherein the system further comprises a unique interfacing object for the plurality of different implementations.

12. The system according to claim 10, wherein the plurality of physical network devices are simulated by the plurality of different implementations of the first module or device, and wherein the system further comprises a respective interfacing object for every one of the plurality of different implementation.

13. The system according to claim 10, wherein the external side of said interfacing object is configured for allowing communication among the plurality of modules or devices as events.

14. The system according to claim 10, wherein the external side of said interfacing object is configured for allowing communication among the plurality of modules or devices as messages.

15. The system according to claim 10, comprising a statistics managing module to collect statistic data pertaining to the operation of said simulated network, said statistics managing module being configured for measuring said statistic data through the external side of said interfacing object.

16. The system according to claim 10, wherein the external side of said interfacing object is configured for exchanging information with homologous objects associated with the plurality of modules or devices through structures comprising:
- an indicator of the source module or device;
- an indicator of the target module or device; and
- the exchanged information.

17. The system according to claim 10, wherein the external side of said interfacing object is configured for exchanging information with homologous objects associated with the plurality of modules or devices through structures comprising:
- an indicator of the source module or device;
- a time indicator;
- an indicator of the target module or device; and
- the exchanged information.

18. The system according to claim 10, wherein said interfacing object comprises functionalities selected from:
- messages dispatching functionality,
- events dispatching functionality,
- messages receiving functionality, and
- events receiving functionality.

19. A system for simulating a telecommunications network according to any one of claims 10 to 18, the system further comprising at least one respective interfacing object having an external side and an internal side with respect to the modelled module or device, said external side of said respective interfacing object having a character that is independent from characteristics of said modelled module or device.

20. A non-transitory computer readable medium encoded with a computer program product loadable into a memory of at least one computer, the computer program product comprising portions of software code for performing the method according to any one of claims 1 to 9.

21. The method of claim 1, wherein the plurality of different implementations correspond to a plurality of different manufactured versions of the at least one physical network device.

22. The method of claim 1, further comprising providing, for each of the plurality of modules or devices a corresponding interfacing object through which the corresponding module or device communicates with other modules or devices, each interfacing object having an external side and an internal side with respect to the corresponding module or device, for each interfacing object the external side using the single communication mechanism for communicating with other modules and devices, the single communication mechanism being independent of the corresponding module or device and being used by each of the plurality of modules or devices for communicating with other modules and devices, and the internal side being configured to communicate with each of the plurality of modules or devices.

23. The system of claim 10, wherein the plurality of different implementations correspond to a plurality of different manufactured versions of the at least one physical network device.

24. The system of claim 10, further comprising, for each of the plurality of modules or devices a corresponding interfacing object through which the corresponding module or device communicates with other modules or devices, each interfacing object having an external side and an internal side with respect to the corresponding module or device, for each interfacing object the external side using the single communication mechanism for communicating with other modules and devices, the single communication mechanism being independent of the corresponding module or device and being used by each of the plurality of modules or devices for communicating with other modules and devices, and the internal side being configured to communicate with each of the plurality of modules or devices.

* * * * *